June 3, 1958 S. C. SHEPARD 2,836,878

ELECTRIC DEVICES EMPLOYING SEMICONDUCTORS

Filed April 20, 1953 2 Sheets-Sheet 1

Inventor
STANLEY C. SHEPARD
By Philip M. Bolton
Attorney

June 3, 1958 S. C. SHEPARD 2,836,878

ELECTRIC DEVICES EMPLOYING SEMICONDUCTORS

Filed April 20, 1953 2 Sheets-Sheet 2

Inventor
STANLEY C. SHEPARD
By Philip M. Bolton
Attorney

United States Patent Office 2,836,878

Patented June 3, 1958

2,836,878

ELECTRIC DEVICES EMPLOYING SEMICONDUCTORS

Stanley Carden Shepard, London, England, assignor to International Standard Electric Corporation, New York, N. Y., a corporation of Delaware Application April 20, 1953, Serial No. 349,641

Claims priority, application Great Britain April 25, 1952

8 Claims. (Cl. 29—25.3)

The present invention relates to mounting arrangements for crystal rectifiers and other devices employing semi-conducting materials.

British Patent No. 708,054, issued August 11, 1954, describes a number of constructions of semi-conductor devices in which the semi-conducting crystal and the electrodes are embedded in a solid compound of the thermosetting type.

The object of the present invention is to provide a method of construction of such devices which is better adapted for very small and very robust semi-conductor devices.

A device constructed according to the method of the invention may, for example, consist of a small solid bead of an insulating compound of the thermosetting or polymerisable type in which are embedded a germanium crystal and one or more electrodes which may be either sharply pointed wires or catswhiskers, or small metal areas plated or deposited on the surface of the crystal, together with a base electrode.

This invention provides a method of making an electric semi-conductor device which comprises the steps of mounting a semi-conductor body on a metal plate, forming a metal wire loop whose area is of the same order as the area of the plate, mounting an electrode on the loop, arranging the plane of the loop substantially parallel to the plane of the plate, thereby forming a skeleton mould, the loop and plate being so spaced that the electrode comes into contact with the surface of the body, filling the skeleton mould with a liquid polymerisable insulating compound, and finally polymerising the said compound to form a solid mass in which the semi-conductor body and the electrode are embedded. The invention also provides a semi-conductor device made according to this method.

The invention will be described with refereneee to the accompanying drawings, in which.

Figure 1:
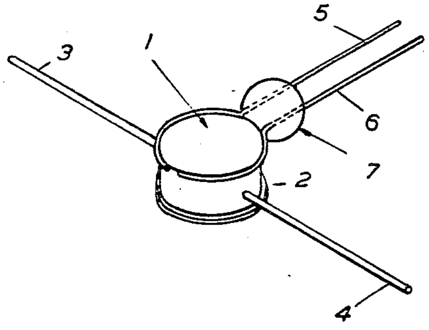
Fig. 1 shows a perspective view of a crystal triode constructed according to the method of the invention.
Figure 2:
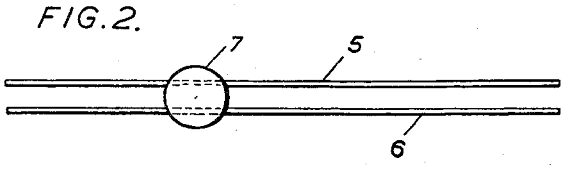
Figs. 2 to 7 show various stages in the process of constructing the device.
Figure 3:
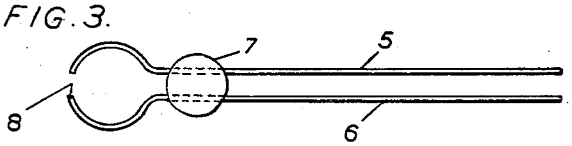

The crystal triode shown in Fig. 1 consists of a solid cylinder 1 of a plastic material of the thermosetting or polymerisable type (which may be about 3/16 inch diameter and 1/8 inch thick) to a flat face of which is attached a thin metal disc or base 2 bearing terminal wires 3 and 4. The terminal wires 5 and 6 for the emitter and collector electrodes emerge from a glass bead 7 set in the wall of the cylinder 1. The triode is of the type having two catswhisker electrodes, and may be constructed as follows:

The two wires 5, 6 (0.014 inch diameter and 2 inches in length) of a copper-nickel-iron alloy are spaced parallel to each other and about 0.05 inch apart, as shown in Fig. 2. The glass bead 7 is applied about 1/2 inch from one end by means of the usual glass-working technique. The stem so formed is then cleaned to remove the borate and oxide, and as shown in Fig. 3, the short ends emerging from the glass bear 7 are bent into nearly complete semicircles and are trimmed so that they substantially form a circle or loop of about 3/16 inch diameter. It is important that the wire circle so formed shall have a small gap in it at 8, otherwise the emitter and collector electrodes, which will be borne by this assembly, will be short circuited.

Figure 4:
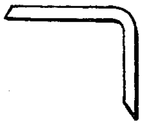
Figure 5:
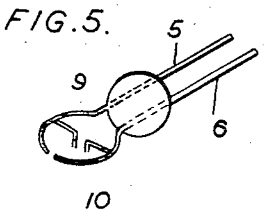

The tip of each of two straight lengths of 0.005 inch diameter wire is ground at an angle and polished, so as to form a chisel edge. Suitable material for the wire is beryllium or Phosphor bronze, for example. Each wire is then bent at a right angle as shown in Fig. 4. The two electrodes 9, 10 so formed are welded respectively to the wires 5 and 6, as shown in Fig. 5, and are spaced so that the points are about 0.002 inch apart. The electrodes 9 and 10 are then the emitter and collector electrodes.

Figure 6:
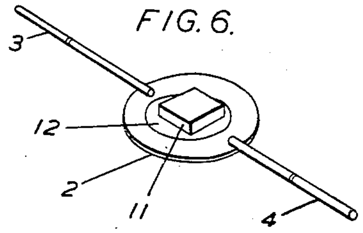

The base assembly is shown in Fig. 6, and is made as follows: Two lengths 3, 4 of cleaned nickel or copper-nickel-iron alloy wire 0.014 inch in diameter are welded or otherwise firmly attached to the edges of the disc 2, which may be 0.02 inch in thickness and 3/16 inch in diameter so that they are diametrically opposed. The germanium crystal 11 is attached to the centre of the disc 2, by means of conducting cement 12, preferably that described in the specification of Wolfson et al., Serial No. 278,527, filed March 25, 1952, or in some other suitable way, such as by soldering.

Figure 7:
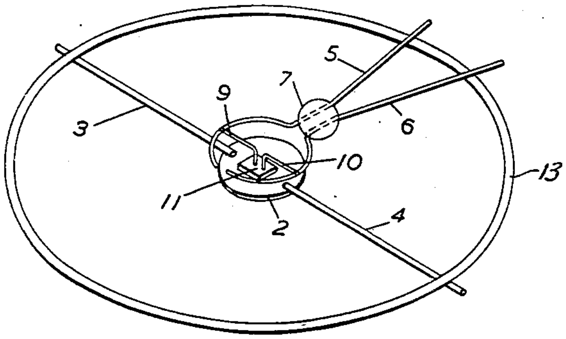

As shown in Fig. 7, the assembly of Fig. 5 is then welded or otherwise firmly attached to a nickel wire ring 13, so that the electrode points are substantially at the centre of the ring.

One of the wires 4 of the crystal assembly (Fig. 6) is likewise attached to the nickel ring 13 so that the germanium crystal 11 is near to the points of the electrodes. At this stage of assembly the unattached wire 3 of the crystal assembly is pushed into contact with the nickel ring 13 by hand. The electrode points should now be in contact with the face of the crystal. If this should not be so, a slight distortion of the nickel wire ring 13 may be made, and/or the wires 5 and 6 may be bent, to achieve the desired relative positioning of the whisker points, and to bring the points of the electrodes into contact with the germanium crystal 11. The wire 3 is now attached to the nickel ring 13, so forming the assembly shown in Fig. 7.

The arrangement of the disc 2 and the loop formed at the ends of the wires 5 and 6 forms a substantially cylindrical skeleton mould for the liquid polymerisable insulating compound which is applied in the following manner:

The assembly of Fig. 7 is heated on a hot plate so that the nickel disc 2 is in contact with the plate. The liquid polymerisable insulating compound is now applied to the skeleton mould until the space between the circular ends of the wires 5 and 6, and the disc 2 is filled. After polymerisation, a solid cylinder of insulating material is formed, which firmly holds the constituent parts of the triode in their correct relative positions.

The polymerisable compound should be one not requiring a solvent, and should have a low shrinkage factor. It should also adhere firmly to metal surfaces when polymerised, and should be substantially impervious to moisture. A satisfactory compound is one of those sold under the registered trade mark "Araldite."

Suitable compounds which have been used are:

(1) Araldite adhesive A.

(2) A mixture of 50% Araldite adhesive A and 50% alumina by weight.

(3) 50% Araldite casting resin B, 50% alumina by weight.

After polymerisation, the device is allowed to cool, and is removed from the nickel wire ring 13 (which may then be used again), for example, by cutting the leads 3, 4, 5 and 6 near to the points where they were welded. The usual electrical forming treatment may then be applied and the crystal triode is now complete.

When an assembly has reached the stage shown in Fig. 7, it is possible to weld other wires bearing catswhiskers (not shown) to the nickel ring 13, and to arrange the points to be near the points of the electrodes 9 and 10. For example, a crystal tetrode has been made by welding one additional wire and catswhisker, and subsequently applying the polymerisable compound, as already described.

Figure 8:
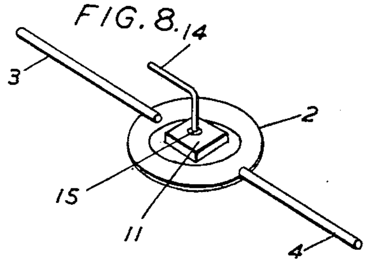
Fig. 8 shows a modification of Fig. 6 to illustrate an alternative method of construction of the device.

An alternative form of crystal triode, in which only one of the electrodes is a catswhisker, may be constructed as follows:

A germanium crystal assembly is constructed, as already described and shown in Fig. 6. A platinum wire 14, bent at a right angle, is cemented to the face of the crystal 11 (Fig. 8) with a small spot 15 of conducting cement. An assembly similar to that shown in Fig. 5, except that the catswhisker 9 is omitted, is fixed to the nickel ring 13 (Fig. 7) together with the crystal assembly, Fig. 8. The point of the catswhisker electrode 10 is arranged to make contact with the face of the germanium crystal 11 within about 0.002 inch of the spot 15. The free end of the wire 14 is then welded or cemented to the wire 5 in place of the wire 9.

The polymerisable compound is applied and polymerised as already described, producing a crystal triode similar in appearance to that previously described.

Referring again to Fig. 7, it is evident that if one of the electrodes 9, 10 is omitted altogether, a simple crystal rectifier will be produced. In that case one of the terminal wires 5, 6 is not wanted and can be cut off close to the bead 7. The single rectifier electrode could evidently be of the kind shown in Fig. 8.

However, in the case of a crystal rectifier, it is not necessary to provide both the wires 5, 6 or the glass bead 7, since only a single terminal wire is needed, and its end could be bent into a complete circle to form the upper part of the skeleton mould.

It should be mentioned that the disc 2 (Fig. 6) on which the crystal 11 is mounted need not be circular, but could be rectangular, for example, or any other convenient shape. The ends of the wires 5, 6 (Fig. 3) should preferably be bent to form a loop of substantially the same shape and area as the disc or plate on which the crystal is mounted.

As already indicated above, the loop may be complete or incomplete, and the word "loop" will be used in the claims to cover both senses.

It should further be mentioned that although in the process described above, the insulating compound is polymerised by the application of heat, there are suitable compounds which will polymerise at room temperature without the application of heat.

The process according to the invention which has been described above enables very small semi-conductor devices to be constructed without difficulty, and the final unit will withstand severe vibration and humidity conditions without detriment to the electrical performance.

While the principles of the invention have been described above in connection with specific embodiments, and particular modifications thereof, it is to be clearly understood that this description is made only by way of example and not as a limitation on the scope of the invention.

What I claim is:

1. A method of making an electric semi-conductor device which comprises the steps of mounting a semi-conductor body on a metal plate, forming a metal wire loop whose area is of the same order as the area of the plate, mounting an electrode on the loop, arranging the plane of the loop substantially parallel to the plane of the plate, thereby forming a skeleton mould, the loop and plate being so spaced that the electrode comes into contact with the surface of the body, filling the skeleton mould with a liquid polymerisable insulating compound, and finally polymerising the said compound to form a solid mass in which the semi-conductor body and the electrode are embedded.

2. A method of making an electric semi-conductor device which comprises the steps of mounting a semi-conducting crystal on a circular metal disc, forming the ends of two parallel terminal wires into nearly complete semi-circles of radius substantially the same as the radius of the disc so as to form a nearly complete flat circular loop without bringing the wires into contact, mounting a pointed wire electrode on one terminal wire, arranging the plane of the loop substantially parallel to the plane of the disc in such manner as to form a skeleton cylindrical mould, the electrode being so shaped, and the spacing between the planes of the disc and loop being so chosen, that the point of the electrode comes into contact with the surface of the crystal, filling the skeleton mould with a liquid polymerisable insulating compound, and finally polymerising the said compound to form a solid cylinder of the insulating compound in which the crystal and electrode are embedded.

3. A method, according to claim 2, in which before arranging the disc and loop to form the skeleton mould, a second pointed wire electrode is mounted on the other terminal wire, the points of both electrodes being brought into contact close together with the surface of the crystal before filling the skeleton mould with the polymerisable compound.

4. A method, according to claim 2, in which a second wire electrode is cemented to the crystal surface with a small spot of conducting cement, the free end of the second wire electrode being attached to the other terminal wire after the disc and loop have been arranged to form the skeleton mould, the point of the first mentioned wire electrode being arranged in contact with the crystal surface close to the edge of the said small spot.

5. A method, according to claim 2, further comprising the step of mounting an additional wire electrode on the other terminal wire so that its end is in contact with the surface of the crystal whereby it will be embedded in the solid cylinder after polymerisation of the insulating compound.

6. A method, according to claim 2 further comprising the step of bending the wire electrode at right angles and forming its end into a chisel point.

7. A method according to claim 2 in which the parallel positions of said terminal wires are fused into a glass bead before the ends are formed into semi-circles.

8. A method according to claim 2 in which two additional straight terminal wires are welded or otherwise firmly attached to the metal disc so as substantially to form continuations of a diameter on opposite sides of the disc, and in which in order to form the skeleton mould, the four terminal wires are welded or otherwise firmly attached to a metal ring of larger diameter than the disc, with the disc substantially at the centre of the ring, the terminal wires being bent in such manner as to arrange the planes of the disc and loop substantially parallel with the proper spacing, the four terminal wire being cut away, or otherwise removed, from the ring after the solidifying of the polymerisable compound.

No references cited.